M. CORRINGTON.
MAINTAINING DEVICE FOR AIR BRAKES.
APPLICATION FILED APR. 13, 1911.
1,037,444.
Patented Sept. 3, 1912.
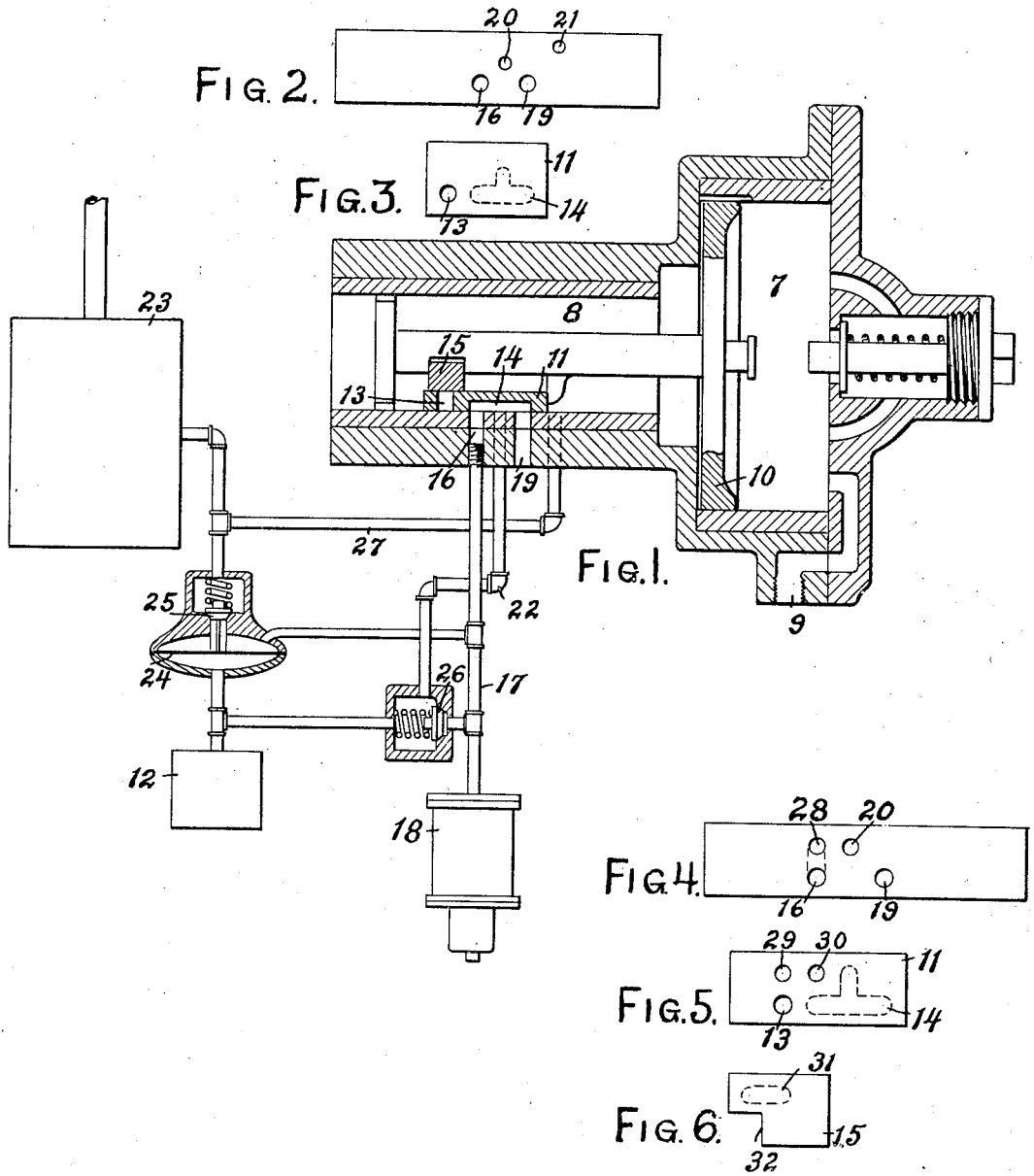

UNITED STATES PATENT OFFICE.

MURRAY CORRINGTON, OF NEW YORK, N. Y., ASSIGNOR, BY MESNE ASSIGNMENTS, TO THE WESTINGHOUSE AIR BRAKE COMPANY, OF PITTSBURGH, PENNSYLVANIA, A CORPORATION OF PENNSYLVANIA.

MAINTAINING DEVICE FOR AIR-BRAKES.

1,037,444. Specification of Letters Patent. Patented Sept. 3, 1912.

Application filed April 13, 1911. Serial No. 620,892.

*To all whom it may concern:*

Be it known that I, MURRAY CORRINGTON, a citizen of the United States, residing at New York, in the county of New York and State of New York, have invented new and useful Improvements in Maintaining Devices for Air-Brakes, of which the following is a specification.

This invention relates to air brakes or other fluid pressure brakes, and more particularly to apparatus for maintaining the pressure in the brake cylinder substantially constant and compensate for leakage therein, during the time that the brakes remain applied.

In the standard air brake apparatus it is well known that the brake cylinders are usually subject to more or less leakage in actual practice, and that, if the brakes are to be held applied for any great length of time, it is necessary to make repeated train pipe reductions for graduating additional amounts of fluid into the brake cylinder, to compensate for the leakage therein. This practice often results in depleting the auxiliary reservoir to a dangerous degree before there is an opportunity to recharge the same, and the object of my present invention is to render these further reductions unnecessary, by providing an improved device whereby the pressure admitted to the brake cylinder in response to any given train pipe reduction, may be automatically maintained substantially constant against leakage and without depleting the auxiliary reservoir.

In the accompanying drawing: Figure 1 is a diagrammatic view showing a car brake equipment embodying one form of my improvement, the triple valve being indicated in vertical section; Fig. 2, a plan of the valve seat of the triple valve; Fig. 3, a top view of the main slide valve; and, Figs. 4, 5, and 6, plan views of a valve seat, a main slide valve, and a graduating slide valve, respectively, showing a slight modification.

As herein shown in Figs. 1, 2, and 3, the triple valve device is of the usual construction, comprising piston chamber 7, containing piston 10, and having train pipe connection 9, valve chamber 8 in open communication at its end with the usual auxiliary reservoir, and containing the main valve 11, having port 13, and cavity 14, and the graduating valve 15, the valve seat having exhaust port 19, and port 16, communicating by pipe 17, with the brake cylinder 18. In addition to these usual parts, I provide a maintaining chamber 12, with which the brake cylinder communicates through a non-return valve 26, and a maintaining valve device comprising a diaphragm 24, subject on one side to the pressure in the maintaining chamber, and on the other side to the brake cylinder pressure for operating the valve 25, for controlling a supply of air to the brake cylinder, to compensate for leakage while the brakes are applied. The maintaining chamber also communicates by pipe 22, and port 20, in the triple valve seat, with the exhaust cavity 14, and exhaust port 19, for releasing air from the maintaining chamber, when the triple valve is in release position. I also preferably provide a supplemental reservoir, 23, or additional source of pressure which may be charged in any desired manner, for instance, as by a pump, or from the train pipe or auxiliary reservoir, through a port 21, and pipe 27. When a service application of the brakes is made in the usual manner by reduction in train pipe pressure, the triple valve moves out to service position, and supplies air from the auxiliary reservoir through port 16 and pipe 17 to the brake cylinder 18, and at the same time, the pressure equalizes into the maintaining chamber through the check valve 26. The diaphragm 24, of the maintaining valve device is then subject to the pressure of the maintaining chamber on its under side, and to the brake cylinder pressure on its opposite side when the triple valve moves to lap position and the brake is held applied. If then there should be a leakage from the brake cylinder, this would diminish the pressure acting on the upper side of the diaphragm, but that in the maintaining chamber below the diaphragm remains constant, being held by the non-return check-valve. The maintaining valve 25 would then open to supply sufficient fluid from the supplemental reservoir to the brake cylinder to compensate for such leakage and to keep the pressure in the brake cylinder constant, as will be readily understood. When the brakes are released by increasing the train pipe pressure in the usual way, the triple valve moves to release position, and the air from the maintaining chamber discharges to the atmosphere through the pipe 22, port 20, exhaust cavity 14, and exhaust port 19, at the same time that the brake cylinder pressure is released.

By adding parts 28 in the valve seat, 29 and 30 in the main valve 11, and cavity 31, in the graduating valve 15, as indicated in Figs. 4, 5, and 6 of the drawing, the triple or automatic valve device operated by the train pipe pressure may be employed for opening communication between the brake cylinder and the maintaining chamber in the service application position, and closing the same in lap position, whereby the maintaining chamber may be kept tightly sealed when the brakes are held applied and the non-return check valve may thus be dispensed with. This construction is also preferred, as it eliminates any danger of leakage of said check valve. According to this modified construction, when the triple valve moves out to service position, ports 29 and 30, in the main slide valve register with ports 28 and 20 in the seat and are brought into communication with each other through cavity 31, in the graduating slide valve 15. The notched portion 32, of the latter valve uncovers the service port 13, so that air from the auxiliary reservoir flows through ports 13 and 16, to the brake cylinder, and through ports 16, 28, 29, cavity 31, and ports 30 and 20, and pipe 22, to the maintaining chamber 12, charging the same and the brake cylinder to the same degree of pressure. When the piston and graduating valve then move to lap position, ports 29 and 30 are disconnected, and port 13 is covered by the graduating valve, so that the communication between the maintaining chamber, and the brake cylinder is cut off, and the maintaining chamber is tightly sealed against leakage. The maintaining valve device then operates as before described, to compensate for leakage from the brake cylinder, and maintains the pressure therein substantially constant. The port, 21, is omitted from the modification shown in Fig. 4.

It is not deemed necessary to describe the action of the triple valve in emergency applications, as this may be the same as with any of the standard triple valves now used, and any suitable or preferred form of quick action mechanism may be employed, if desired.

Having now described my invention, what I claim as new and desire to secure by Letters Patent, is:—

1. In a fluid pressure brake, the combination with a train pipe, auxiliary reservoir, and brake cylinder, of a maintaining chamber, an automatic valve device operating in response to variations in train pipe pressure for opening and closing communication between the brake cylinder and maintaining chamber, and means governed by the pressure in the maintaining chamber for controlling a supply of fluid to the brake cylinder to compensate for leakage.

2. In a fluid pressure brake, the combination with a train pipe, auxiliary reservoir, and brake cylinder, of a maintaining chamber, a triple valve device having means for opening communication between the brake cylinder and maintaining chamber in service application position, and closing same in lap position, and means governed by the pressure in the maintaining chamber for controlling a supply of fluid to the brake cylinder to compensate for leakage.

3. In a fluid pressure brake, the combination with a train pipe, auxiliary reservoir, and brake cylinder, of a maintaining chamber, a triple valve device for supplying fluid from the auxiliary reservoir to the brake cylinder and to the maintaining chamber in service position, and having means for cutting off communication between the brake cylinder and the maintaining chamber in lap position, and a maintaining valve device governed by the opposing pressures of the maintaining chamber and the brake cylinder for controlling a supply fluid to the brake cylinder to compensate for leakage.

4. In a fluid pressure brake, the combination with a train pipe, auxiliary reservoir, and brake cylinder, of a maintaining chamber, a triple valve device having means for supplying fluid from the auxiliary reservoir to the brake cylinder and to the maintaining chamber in service application position, for cutting off communication between the brake cylinder and the maintaining chamber in lap position, and for releasing fluid from the brake cylinder and maintaining chamber in release position, of a maintaining valve device governed by the pressure in the maintaining chamber for controlling a supply of fluid to the brake cylinder.

5. In a fluid pressure brake, the combination with a train pipe, auxiliary reservoir, and brake cylinder, of a maintaining chamber, a supplemental reservoir, a triple valve device having means for opening and closing communication between the brake cylinder and the maintaining chamber, and a maintaining valve device governed by the pressure in the maintaining chamber for controlling a supply of fluid from the supplemental reservoir to the brake cylinder when the triple valve is in lap position.

In testimony whereof I have hereunto set my hand.

MURRAY CORRINGTON.

Witnesses:
M. LAWSON DYER,
A. S. FOWLER.